United States Patent [19]

Lewis et al.

[11] 4,437,699
[45] Mar. 20, 1984

[54] MONOCOQUE TRAILER OR BODY SIDE CONSTRUCTION

[75] Inventors: Mack A. Lewis, Sioux City, Iowa; Mike R. Spencer, Hubbard, Nebr.

[73] Assignee: Wilson Trailer Co., Sioux City, Iowa

[21] Appl. No.: 321,554

[22] Filed: Nov. 16, 1981

[51] Int. Cl.³ .............................................. B62D 33/04
[52] U.S. Cl. ..................................... 296/181; 52/595; 105/409
[58] Field of Search ............... 296/181, 183, 187, 193, 296/29, 36, 1 R; 105/396, 409; 52/595

[56] References Cited

U.S. PATENT DOCUMENTS

| | | | |
|---|---|---|---|
| 2,384,965 | 9/1945 | Reid | 296/181 |
| 2,400,253 | 5/1946 | Ostlund | 296/181 |
| 2,433,158 | 12/1947 | Reid | 296/181 |
| 2,459,765 | 1/1949 | Black | 296/181 |
| 2,901,283 | 8/1959 | Curell | 296/181 |
| 3,380,216 | 4/1958 | Spence | 296/181 |
| 4,015,876 | 4/1977 | Hulverson et al. | 296/181 |

Primary Examiner—Richard A. Bertsch
Attorney, Agent, or Firm—Harvey B. Jacobson

[57] ABSTRACT

A body wall having a horizontal length and a vertical height and including a plurality of elongated upstanding panel members spaced along the wall and including adjacent laterally overlapped longitudinal side marginal strips. One marginal strip of each pair of overlapped side marginal strips is generally planar and the other marginal strip is slightly laterally offset to one side of the corresponding panel member and includes laterally spaced generally coplanar opposite longitudinal marginal border portions and a longitudinally extending central channel portion disposed between and formed integrally with the border portions with the central channel portion opening toward the aforementioned one marginal strip. Securing structure secures at least longitudinally spaced portions of each of the border portions of the other marginal strip to corresponding portions of the one marginal strip toward which the central channel portion of the other marginal strip opens. Each of the panel members includes longitudinally spaced perforations formed therein with each perforation being bordered by continuous elongated marginal zones of the corresponding panel member extending thereabout and each marginal zone includes equally and oppositely transversely angled laterally adjacent band portions whereby the band portion disposed immediately about the corresponding perforation generally parallels the portion of the corresponding panel member disposed outwardly of the perforation bording zone.

9 Claims, 11 Drawing Figures

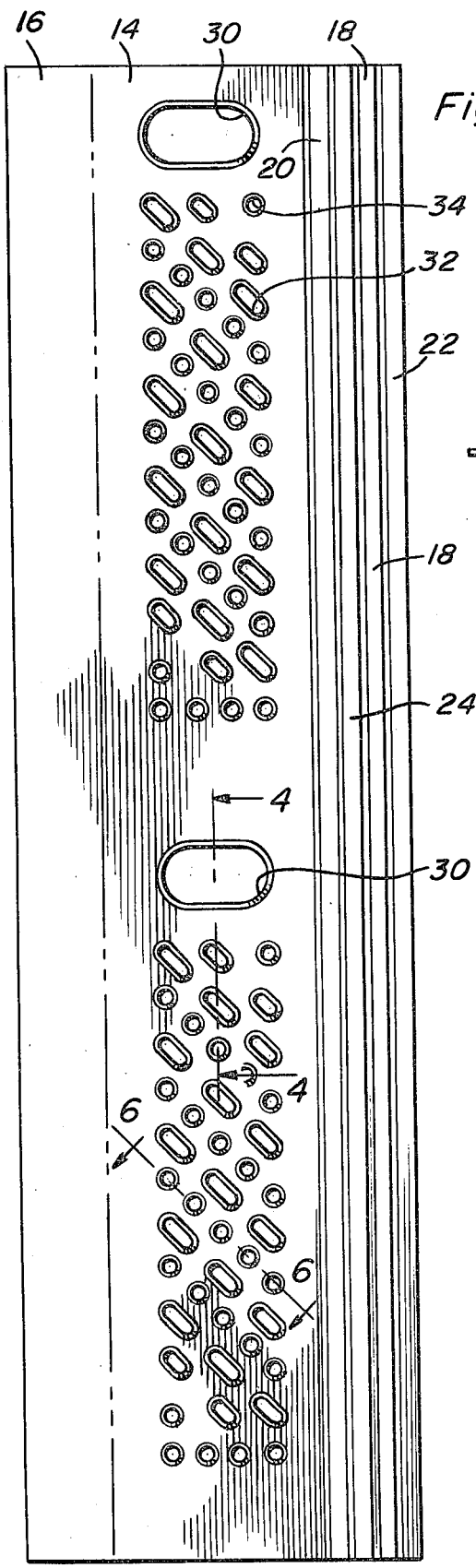
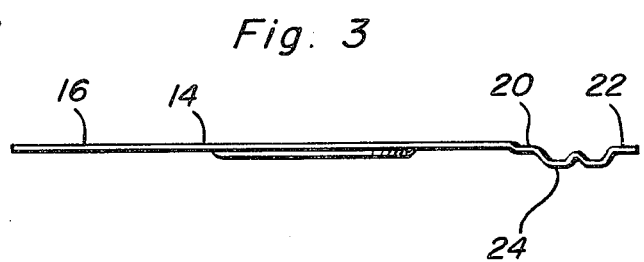
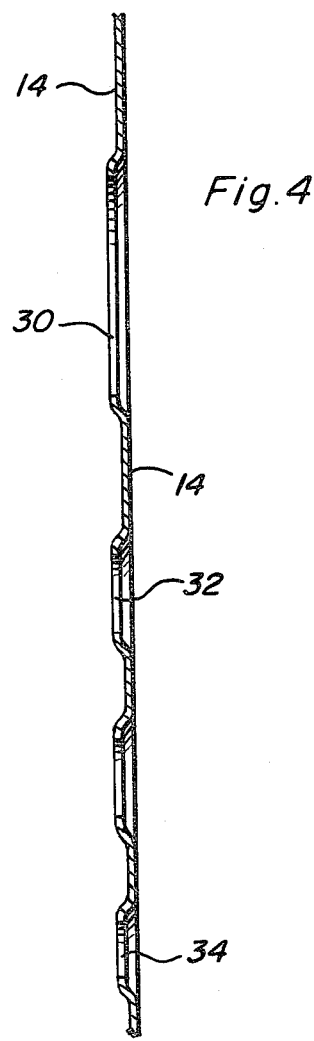

MONOCOQUE TRAILER OR BODY SIDE CONSTRUCTION

BACKGROUND OF THE INVENTION

When forming a monocoque vehicle body, or the like, individual upstanding panel members may be spaced along a body wall and joined together at each pair of adjacent vertical edges through the utilization of stiffener structure which may be in the form of a channel member. In addition, each panel member may include structure which stiffens the panel member and the various panel members, when properly joined together and to a subframe, form a body construction which is self-supporting and adds to the over-all strength of the subframe. However, some monocoque body constructions are preferably exteriorly or interiorly substantially smooth and some body constructions are purposely perforated for air circulation. These requirements present difficulties in constructing a monocoque body retaining its strength and stiffness. Accordingly, a need exists for an improved monocoque body construction which may be either exteriorly or interiorly smooth and which may include wall perforations which increase wall panel stiffness.

Examples of previously known forms of monocoque body constructions as well as other similar structures, including some of the general structural and operational features of the instant invention, are disclosed in U.S. Pat. Nos. 2,384,965, 2,400,253, 2,459,765, 2,901,283 and 3,380,216.

SUMMARY OF THE INVENTION

The monocoque body construction of the instant invention includes structural features which enable the walls of the body construction to be substantially smooth either interiorly or exteriorly. In addition, the body construction is composed of interconnected vertically extending body panels which are laterally overlapped and define a stiffening channel at each overlapped zone of adjacent body panels. Further, the body construction incorporates a novel rub rail and body to subframe mounting structure for use when the body construction is to be substantially smooth on its exterior.

The main object of this invention is to provide a monocoque body construction incorporating the utilization of vertically extending side wall panels which are laterally overlapped along adjacent vertical edge portions in a manner to define stiffening channels.

Another object of this invention is to provide body panels of the perforated type and yet perforated in a manner which increases the stiffness of each panel member and also reduces metal fatigue in the areas of the panels adjacent the perforations formed therein and further reduces the possibility of injury to animals coming into contact with marginal portions of the panel members defining perforations formed therein.

Another very important object of this invention is to provide a monocoque body construction including features thereof facilitating rapid assembly from individual preformed components.

A still further object of this invention is to provide a monocoque body construction wherein major wall assemblies of the body construction may be readily formed from a plurality of a single type of wall panels.

A final object of this invention to be specifically enumerated herein is to provide a monocoque body construction in accordance with the preceding objects and which will conform to conventional forms of manufacture, be of simple construction and easy to construct.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a side elevational view of one of the vertical panels utilized in the construction of the body illustrated in FIG. 1.;

FIG. 3 is a top view of the panel illustrated in FIG. 2;

FIG. 4 is an enlarged fragmentary vertical sectional view taken substantially upon the plane indicated by the section line 4—4 of FIG. 2;

DETAILED DESCRIPTION OF THE INVENTION

Figure 1:
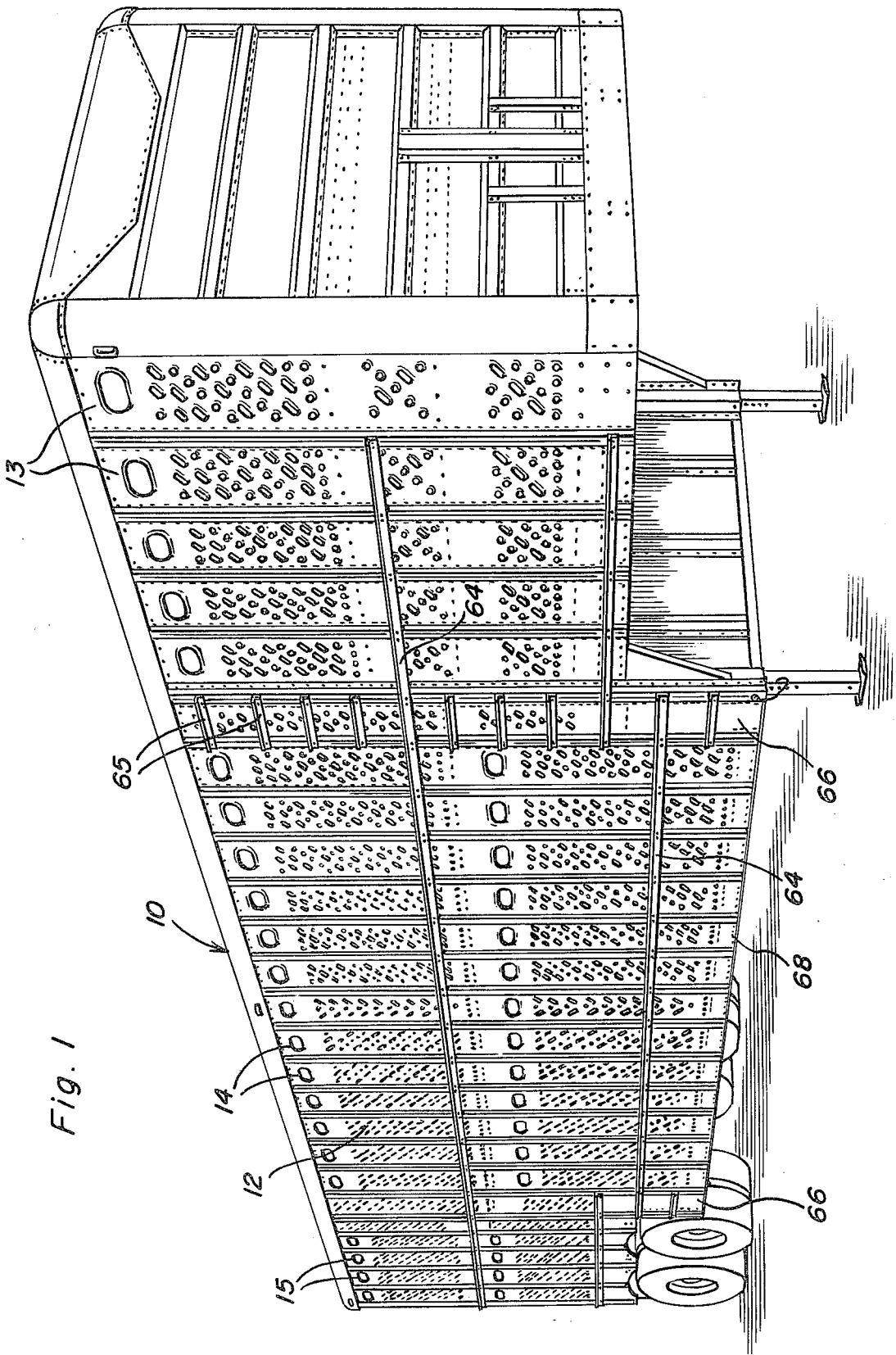
FIG. 1 is a perspective view of a semi-trailer incorporating a monocoque body constructed in accordance with the present invention.
Figure 5:
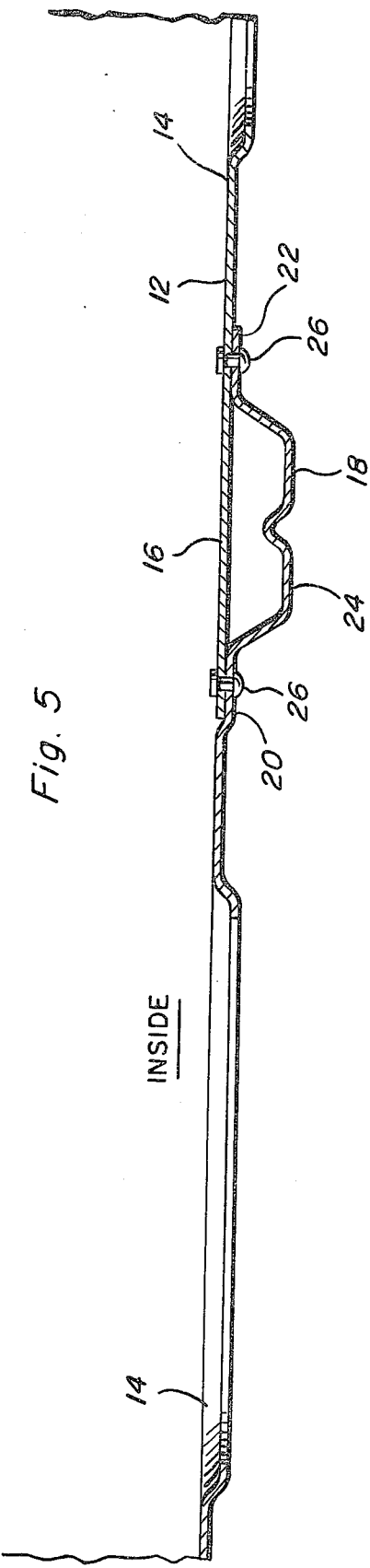
FIG. 5 is a fragmentary enlarged horizontal sectional view illustrating the manner in which adjacent panels may be connected to form a substantially smooth inner wall surface.
Figure 6:
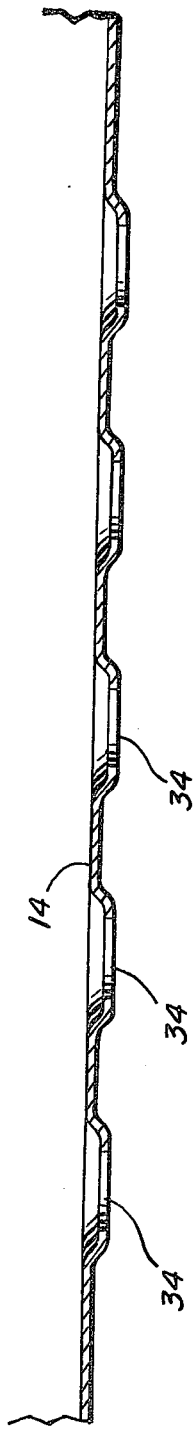
FIG. 6 is an enlarged fragmentary sectional view taken substantially upon the plane indicated by the section line 6—6 of FIG. 2.
Figure 7:
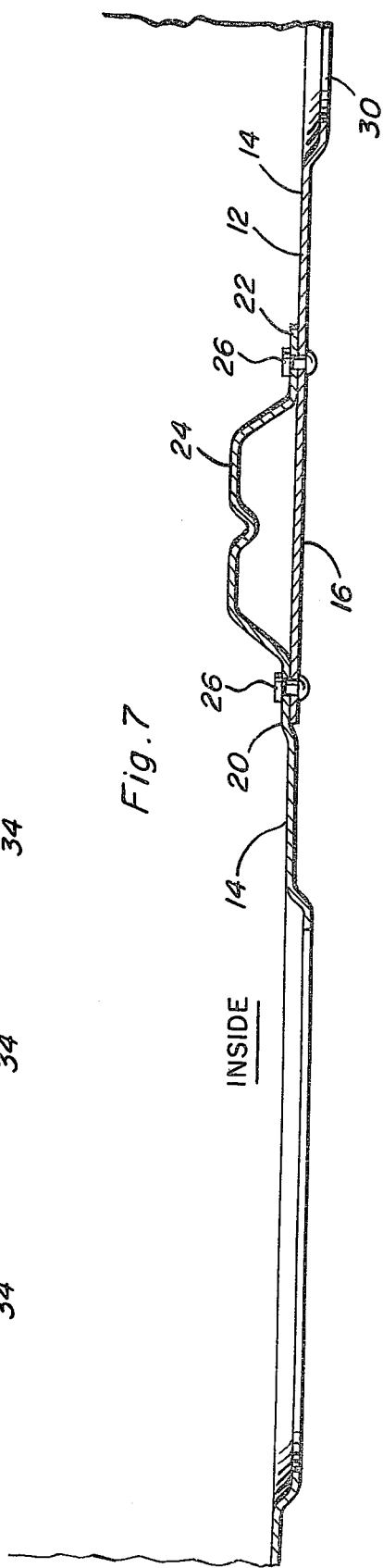
FIG. 7 is a fragmentary enlarged sectional view illustrating the manner in which the panels of the body may be interconnected in order to provide a substantially smooth outer surface exclusive of those areas of the panels disposed immediately adjacent the perforations formed therein.

Referring now more specifically to the drawings, the numeral 10 generally designates a semi-trailer constructed in accordance with the present invention and wherein one wall 12 of the trailer incorporates the monocoque construction to be hereinafter more fully described.

The wall 12 comprises a plurality of vertically elongated upstanding panel members 13, 14 and 15 of different lengths. Of course, the difference in the lengths of the panel members 13, 14 and 15 may vary according to the type of trailer to be constructed and the wall 12 could be constructed of either all panel members 13, 14 or 15 if the trailer 10 was not to be of the drop-center type. Further, it is to be noted that the wall 12 may also be used in the construction of other monocoque bodies.

With attention now invited more specifically to FIGS. 2 through 5, it may be seen that each of the panel members 14 comprises a generally planar panel member including opposite side longitudinal marginal strips 16 and 18. The marginal strip 16 is substantially planar and the other marginal portion 18 includes laterally spaced generally coplanar opposite longitudinal marginal boder portions 20 and 22 which are slightly laterally offset to one side of the corresponding panel member 14, see FIGS. 2 and 3.

The marginal strip 18 further includes a central channel portion 24 formed integrally with the border portions 20 and 22. Adjacent marginal strips 16 and 18 of adjacent panel members 14 are laterally overlapped in the manner illustrated in FIG. 5 of the drawings with a plurality of fasteners, such as rivets 26, secured through each border portion 22 at points spaced longitudinally therealong and also through the corresponding portions of the marginal strip 16. The panel member 14 may be constructed of any suitable metal such as aluminum or steel, aluminum being preferred due to its light weight.

Each of the panel members 14 includes a plurality of longitudinally spaced apertures 30, 32 and 34 formed therethrough. The apertures 30 are horizontally disposed and generally oblong in plane shape, the apertures 32 are also oblong but are inclined and the apertures 34 are generally circular.

Figure 11:
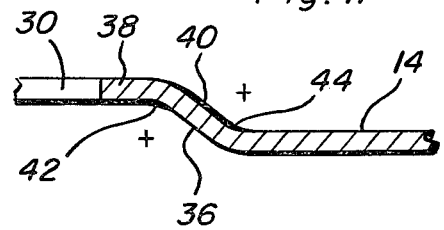
FIG. 11 is an enlarged fragmentary sectional view illustrating the manner in which the panel portions disposed immediately about each perforation are formed in order to reinforce the body panel about each perforation.

With attention now invited more specifically to FIG. 11 of the drawings, it may be seen that the perforations 30 are each bound or bordered by a continuous elongated marginal zone 36 of the corresponding panel member 14 and that each marginal zone includes adjacent equally and oppositely transversely angled laterally adjacent band portions 38 and 40 disposed immediately thereabout. The band portions 38 disposed immediately adjacent the apertures 30 are disposed in parallel planes which parallel the medial plane of the major portion of the panel member 14 and the band portions 40 are inclined approximately 45° relative to the portions 38. In addition, when the portions 38 and 40 are formed, they are radiused one-quarter inch at 42 and 44. These radiused areas 42 and 44, in addition to the relatively angulated border portions 38 and 40, form reinforcing areas of the panel member 14 about the apertures 30 and serve to stiffen the panel members 14. It is to be noted that the border portions extending about each aperture 32 and 34 are similarly formed.

Figure 8:
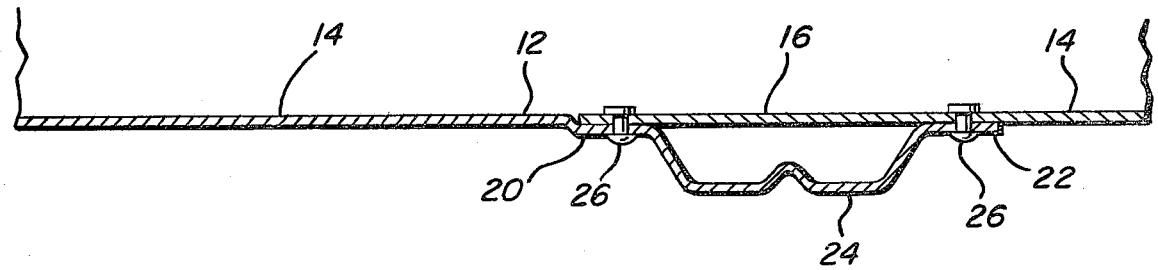
FIG. 8 is an enlarged sectional view similar to FIG. 5, but illustrating the use of non-perforated panels.
Figure 9:
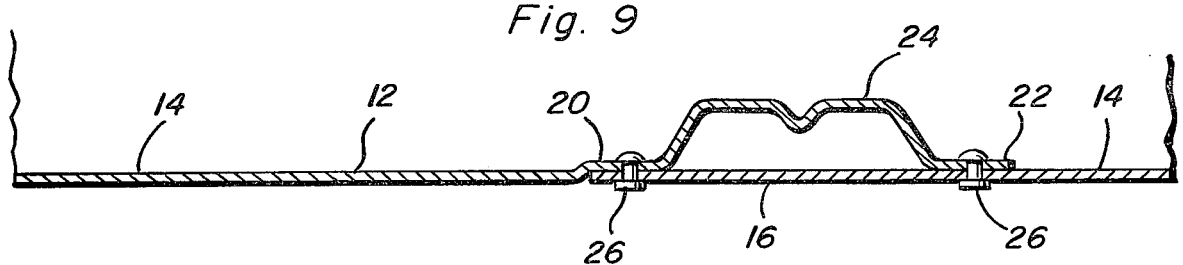
FIG. 9 is a sectional view similar to FIG. 7, but illustrating the use of non-perforated panels.

With attention now invited more specifically to FIGS. 5, 7, 8 and 9 it may be seen that panel members 14 may be perforated with the border portions 38 and 40 disposed to the exterior sides of the panel members 14 and that the channel portions 24 may also be disposed to the exterior of the panel members 14 defining the wall 12. In this manner, the inner surface of the wall 12 is substantially smooth. As may be seen from FIG. 7 of the drawings, the wall 12 may be of substantially the same construction, but the channel portions 24 may be disposed to the inner side of the wall 12 leaving only the border portions 38 and 40 disposed about the apertures 30 projecting outwardly of the outer surface of the wall 12. In FIG. 8 of the drawings, it may be seen that the panel members 14 may be imperforate and that the channel portions 24 may be disposed to the exterior of the wall 12 and from FIG. 9 of the drawings it may be seen that the wall 12 may be constructed of panel members 14 having the channel portions 24 thereof offset to the inner side of the wall 12. Accordingly, the wall 12 may include either inner or outer channel portions 24 and the wall 12 may be composed of panel members which are imperforate or provided with the perforations 30, 32 and 34. Further, although the perforations 30, 32 and 34 are illustrated only as being defined by adjacent border portions 38 and 40 which project outwardly of the outer surfaces of the associated wall, it is to be noted that the border portions 38 and 40 could project inwardly of the inner surface of the corresponding wall.

Further, each of the panel members 13 and 15 may be formed in substantially the same manner as the panel members 14 and have their adjacent marginal edges also joined together in the same manner in which the adjacent marginal edges of the panel members 14 are jointed together.

Figure 10:
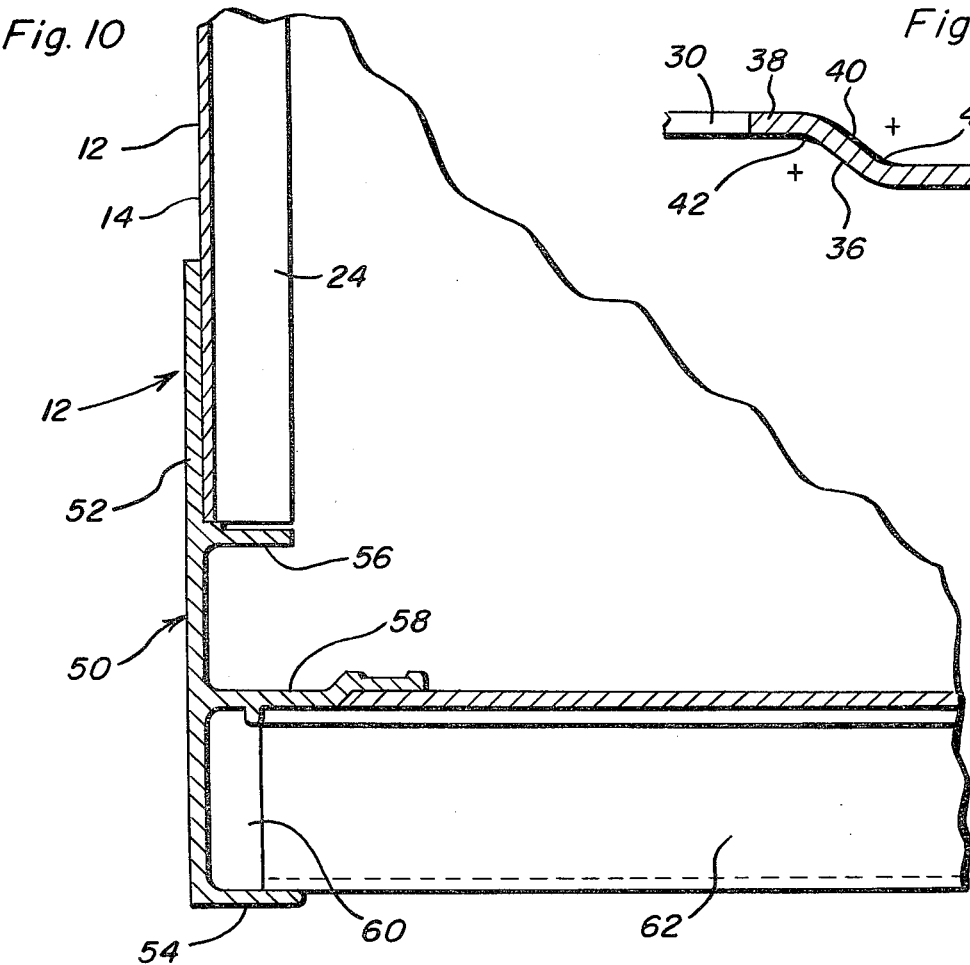
FIG. 10 is an enlarged fragmentary transverse vertical sectional view illustrating the manner in which the wall constructions illustrated in FIGS. 7 and 9 may be utilized in conjunction with a modified form of rub rail.

With attention now invited more specifically to FIG. 10 of the drawings, there may be seen an improved form of rub rail referred to in general by the reference numeral 50. The rub rail 50 includes a vertical flange 52 terminating downwardly in an inwardly projecting lower horizontal flange 54 and includes an upper inwardly projecting horizontal flange 56 spaced below the upper marginal edge of the flange 50. Further, an intermediate horizontal inwardly projecting flange 58 is carried by the vertical flange 52 and is disposed generally centrally intermediate the flanges 54 and 56. The area defined between the flanges 54 and 58 defines an inwardly opening channel 60 in which the adjacent ends of longitudinally spaced and transversely extending floor joists or beam 62 may be secured and the flange 56 defines an upwardly facing abutment against which the lower marginal edges of the panel members 14 may abut. Of course, the fasteners or rivets 26 utilized to secure adjacent marginal edges of the panel members 14 together are increased in length and may be increased in diameter along those portions of the adjacent portions of the panel members 14 which are overlapped by the upper marginal edge of the vertical flange 52 disposed above the flange 56. In this manner, these rivets or other fasteners of increased size may be utilized to anchor the lower marginal portion of the wall 12 to the rub rail 50.

If it is desired, exterior longitudinal channel members 64 may be secured across the central bight portions of the channel members 24 in order to provide additional rigidity to the monocoque wall 12 and further channel members 65 may be incorporated at the opposite ends 66 of the drop center portion 68 of the wall 12 to define ladder rungs.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A monocoque body wall having a horizontal length and a vertical height, said wall including a plurality of elongated upstanding panel members having upstanding opposite side marginal strips, said panel members being spaced along said wall and including adjacent laterally overlapping longitudinal side marginal strips, one side marginal strip of each pair of overlapped side marginal strips being generally planar and the other marginal strip of each pair of overlapped side marginal strips being slightly laterally offset to one side of the corresponding panel member and including laterally spaced generally coplanar opposite longitudinal marginal border portions and a longitudinally extending central channel portion disposed between and formed integrally with said border portions, said channel portions opening toward said one marginal strip, and securing means securing at least longitudinally spaced portions of each of said border portions to corresponding portions of said one overlapped strip, said wall including a lower longitudinal marginal portion defined by the lower ends of said panel members, a rub rail extending along said lower marginal portion including a vertical outer flange, a lower inwardly projecting horizontal flange carried by the lower marginal portion of said verticl outer flange, an upper inwardly projecting horizontal flange carried by said vertical flange a spaced distance below the upper marginal edge of said vertical flange, and an intermediate inwardly projecting horizontal flange carried by said vertical flange spaced intermediate said upper and lower flanges, said intermediate and lower flanges being adapted to receive corresponding ends of floor beams therebetween and the lower ends of said panel members being downwardly abutted against said upper flange and being secured to the inner surface of the upper portion of said vertical flange disposed above said intermediate flange.

2. A monocoque body wall having a horizontal length and a vertical height, said wall including a plurality of elongated upstanding panel members having upstanding opposite side marginal strips, said panel members being spaced along said wall and including adjacent laterally overlapping longitudinal side marginal strips, one side marginal strip of each pair of overlapped side marginal strips being generally planar and the other marginal strip of each pair of overlapped side marginal strips being slightly laterally offset to one side of the corresponding panel member and including laterally spaced generally coplanar opposite longitudinal marginal border portions and a longitudinally extending central channel portion disposed between and formed integrally with said border portions, said channel portions opening toward said one marginal strip, and securing means securing at least longitudinally spaced portions of each of said border portions to corresponding portions of said one overlapped strip, said wall including inner and outer sides, said one overlapped marginal strip being lapped over the outer side of said other overlapped marginal strip, said wall including a lower longitudinal marginal portion defined by the lower ends of said panel members, a rub rail extending along said lower marginal portion including a vertical outer flange, a lower inwardly projecting horizontal flange carried by the lower marginal portion of said vertical outer flange, an upper inwardly projecting horizontal flange carried by said vertical flange a spaced distance below the upper marginal edge of said vertical flange, and an intermediate inwardly projecting horizontal flange carried by said vertical flange spaced intermediate said upper and lower flanges, said intermediate and lower flanges being adapted to receive corresponding ends of floor beams therebetween and the lower ends of said panel members being downwardly abutted against said upper flange and being secured to the inner surface of the upper portion of said vertical flange disposed above said intermediate flange.

3. The body wall of claim 2 wherein said securing means includes fasteners secured through longitudinally spaced portions of said border portions and said corresponding portions of said one overlapped strip.

4. The body wall of claim 2 wherein said wall includes inner and outer sides, said one overlapped marginal strip being lapped over the inner side of said other overlapped marginal strip.

5. A monocoque body wall having a horizontal length and a vertical height, said wall including a plurality of elongated upstanding panel members having upstanding opposite side marginal strips, said panel members being spaced along said wall and including adjacent laterally overlapping longitudinal side marginal strips, one side marginal strip of each pair of overlapped side marginal strips being generally planar and the other marginal strip of each pair of overlapped side marginal strips being slightly laterally offset to one side of the corresponding panel member and including laterally spaced generally coplanar opposite longitudinal marginal border portions and a longitudinally extending central channel portion disposed between and formed integrally with said border portions, said channel portions opening toward said one marginal strip, and securing means securing at least longitudinally spaced portions of each of said border portions to corresponding portions of said one overlapped strip, said panel members each including longitudinally spaced perforations formed therein, said perforations each being bordered by a continuous elongated marginal zone of the corresponding panel member extending thereabout, each of said marginal zones including equally oppositely transversely angled laterally adjacent band portions, whereby the band portion disposed immediately about the corresponding perforation is disposed in a plane generally paralleling the associated panel member portion disposed outwardly of the perforation bordering zones thereof.

6. The body wall of claim 5 wherein said wall includes inner and outer sides and said band portion disposed immediately about each perforation is offset outwardly of said outer side.

7. The body wall of claim 6 wherein said one overlapped strip is lapped over the outer side of said other overlapped strip.

8. The body wall of claim 6 wherein said one overlapped strip is lapped over the inner side of said overlapped strip.

9. A monocoque body wall haing a horizontal length and a vertical height, said wall including a plurality of elongated upstanding panel members having upstanding opposite side marginal strips, said panel members being spaced along said wall with adjacent longitudinal side marginal strips laterally overlapped and secured together, said panel members each including longitudinally spaced perforations formed therein, said perforations each being bordered by a continuous elongated marginal zone of the corresponding panel member extending thereabout, each of said marginal zones including equally oppositely transversely angled laterally adjacent band portions with the band portion disposed immediately about the corresponding perforation being disposed in a plane generally paralleling the associated panel member portion spaced outwardly of the perforation bordering zones thereof.

* * * * *